United States Patent
Merklein et al.

[11] Patent Number: 5,990,675
[45] Date of Patent: Nov. 23, 1999

[54] ANTI-FRICTION BEARING WITH SPEED MEASURING DEVICES HAVING AN ACTIVE MICROCIRCUIT AND A FREQUENCY GENERATOR

[75] Inventors: Harald Merklein, Schweinfurt; Rainer Breitenbach, Gochsheim; Heinrich Hofmann, Schweinfurt, all of Germany

[73] Assignee: FAG Automobiltechnik AG, Germany

[21] Appl. No.: 08/908,110

[22] Filed: Aug. 11, 1997

[30] Foreign Application Priority Data

Aug. 10, 1996 [DE] Germany .............. 196 32 345

[51] Int. Cl.⁶ .................................. G01P 3/36
[52] U.S. Cl. .............. 324/175; 324/207.16; 324/207.25
[58] Field of Search .............. 324/175, 96, 244.1, 324/207.11, 207.15, 207.16, 207.17, 207.25, 207.26, 166; 384/446, 448; 340/870.16, 870.31, 870.3; 250/227.16, 231.13, 231.18, 231.17, 227.17, 227.21; 343/832

[56] References Cited

U.S. PATENT DOCUMENTS

| | | | |
|---|---|---|---|
| 4,259,637 | 3/1981 | Bloomfield et al. | 324/166 |
| 4,688,951 | 8/1987 | Guers | 384/446 |
| 4,850,722 | 7/1989 | Bayer | 384/448 |

FOREIGN PATENT DOCUMENTS

| | | | |
|---|---|---|---|
| 1018660 | 10/1957 | Germany | 324/175 |
| 002909735 | 9/1980 | Germany | 324/175 |
| 3317284A1 | 11/1984 | Germany . | |
| 3735070A1 | 4/1989 | Germany . | |

OTHER PUBLICATIONS

Electronic Tachometer, Electronic Industries, pp. 80–82, 1945.

*Primary Examiner*—Jay Patidar
*Attorney, Agent, or Firm*—Ostrolenk, Faber, Gerb & Soffen, LLP

[57] ABSTRACT

An anti-friction bearing with a speed measuring device includes a transmitter for directing high frequency waves toward a side of the bearing and the transmitter being spaced from the bearing. A coding disk at the side of the bearing is arranged on the relatively rotatable ring. The coding disk has parts around the bearing at which the disk reflects the waves and other parts not reflecting or permitting passage of the waves. The waves are alternately reflected off the coding disk and not reflected off the disk to a receiver arranged outside the bearing. The resulting pulses may be fed to a signal processor. Variations include the coding disk having various constructional design features permitting or blocking the reflection of waves. Alternatively, a circuit at the stationary part of the bearing seal between the bearing rings is alternately impinged upon or protected from being impinged upon by waves due to the coding disk on the relatively movable part of the ring. Arrangements of a plurality of transmitters and/or receivers help detect the direction of rotation.

7 Claims, 6 Drawing Sheets

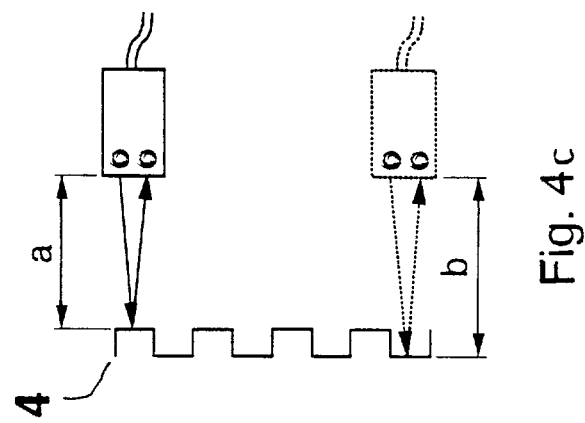
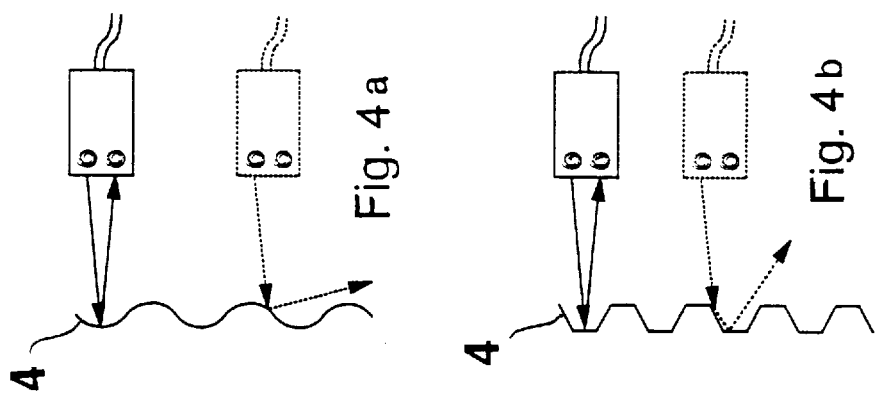
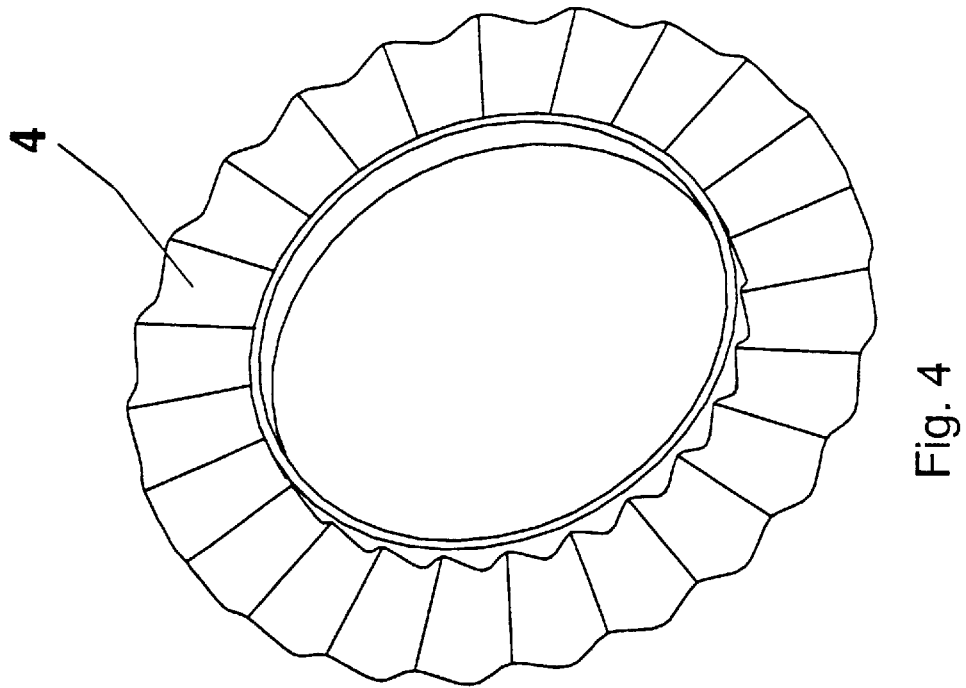

5,990,675

ANTI-FRICTION BEARING WITH SPEED MEASURING DEVICES HAVING AN ACTIVE MICROCIRCUIT AND A FREQUENCY GENERATOR

BACKGROUND OF THE INVENTION

The present invention relates to an anti-friction bearing with a speed measuring device which employs an external high frequency wave transmitter and a receiver or other circuit which receives the signal from the transmitter. Means between the transmitter and the receiver and at the movable bearing ring alternately permit the waves to reach the receiver or block waves and the pulses are measured.

There is a need to provide many anti-friction bearings with means for detecting their speed of rotation. It is known to equip motor vehicle wheel bearings with speed detection, for instance, to derive the speed from signals obtained and to use it to control an anti-lock system. As it is desired to detect even low speeds of rotation, the sensor must be positioned at a very small distance from the pulse generator wheel or from a coding disk.

An anti-friction bearing having a pulse generating disk integrated in the seal of the bearing between the rings of the bearing is disclosed in DE 37 35 070 A1. However, the sensor must be spaced with a small air gap from the sealing disk, since the strength of the signal decreases as the square of the distance away.

U.S. Pat. No. 4,688,951 discloses an anti-friction bearing in which the electric signals are to be transmitted without contact. In this case, a sensor is arranged on the rotating bearing ring and transmits the electric signals to a receiver by capacitive or inductive changes in field or in the form of radio waves. The transmitter must be supplied with energy from a battery or a mini-generator. However, this is cumbersome, susceptible to faults and expensive.

SUMMARY OF THE INVENTION

The object of the present invention is to improve an anti-friction bearing of the aforementioned type to avoid the disadvantages while the bearing is of simple and inexpensive construction and of small dimensions.

A further object is to obtain telemetric transmission of energy and signals between the bearing and its surroundings which transmissions are insensitive to tolerances of the bearing and surrounding parts.

An anti-friction bearing with a speed measuring device includes a transmitter for directing high frequency waves toward a side of the bearing and the transmitter being spaced from the bearing. A coding disk at the side of the bearing is arranged on the relatively rotatable ring. The coding disk has parts around the bearing at which the disk reflects the waves and other parts not reflecting or permitting passage of the waves. The waves are alternately reflected off the coding disk and not reflected off the disk to a receiver arranged outside the bearing. The resulting pulses may be fed to a signal processor. Variations include the coding disk having various constructional design features permitting or blocking the reflection of waves. Alternatively, a circuit at the stationary part of the bearing seal between the bearing rings is alternately impinged upon or protected from being impinged upon by waves due to the coding disk on the relatively movable part of the ring. Arrangements of a plurality of transmitters and/or receivers help detect the direction of rotation.

Because interruption of a high frequency telemetric signal flow by the coding disk produces the signal, reliable detection of speed and transmission can be obtained with a simple, miniaturizable construction, without the use of Hall or magneto-restrictive sensors.

Other features and advantages of the present invention will become apparent from the following description of the invention which refers to the accompanying drawings.

BRIEF DESCRIPTION OF THE DRAWINGS

FIG. 4 shows an undulated or corrugated coding disk;

FIGS. 4a, 4b and 4c illustrate various beam paths for different surface profiles of the disk of FIG. 4;

DETAILED DESCRIPTION OF EMBODIMENTS OF THE INVENTION

Figure 1:
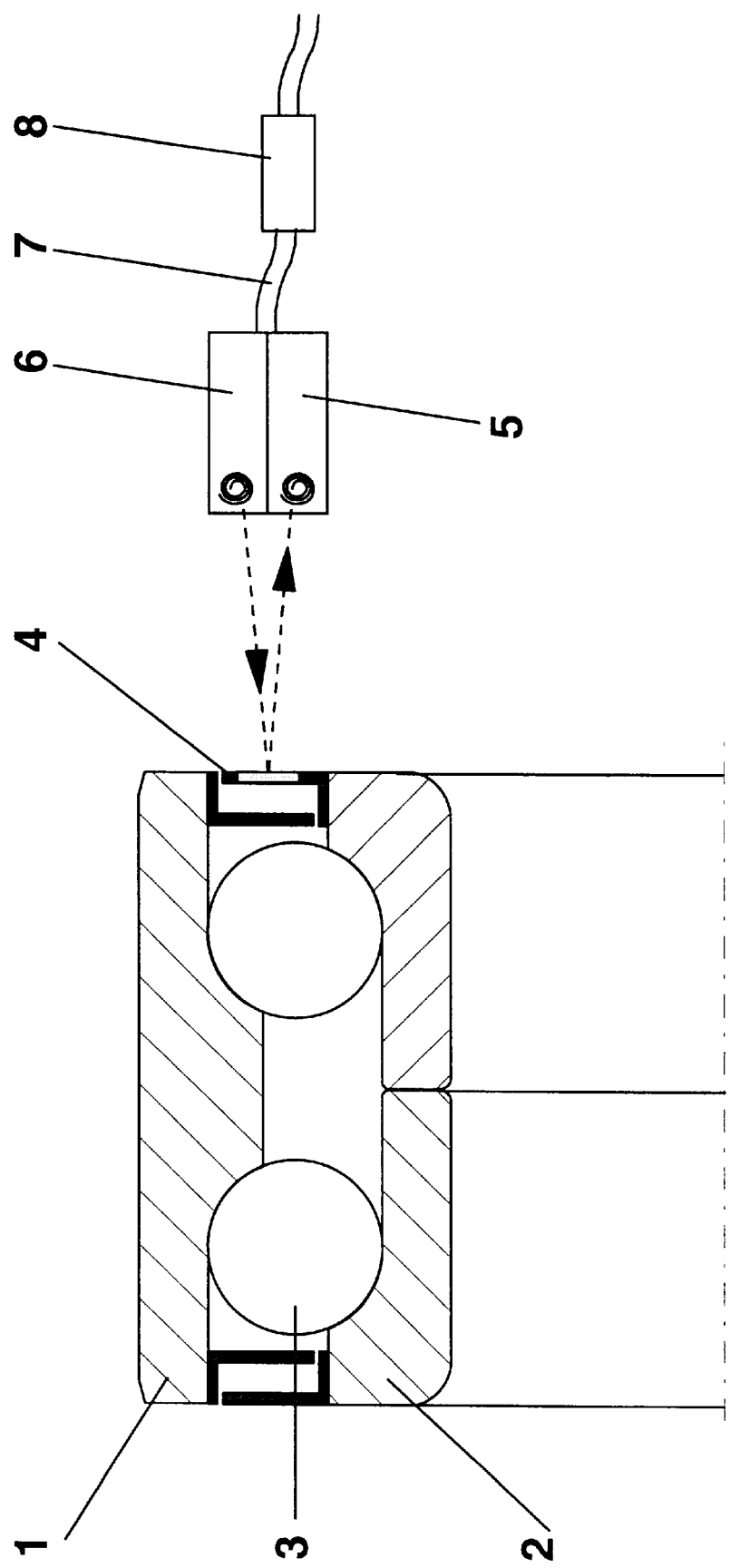
FIG. 1 diagrammatically shows a bearing construction in which the reflection of electromagnetic high frequency waves on a coding part is used to produce the signal.

FIG. 1 shows an anti-friction bearing including an outer bearing ring 1, an inner ring 2 inside the outer ring, rolling bodies 3 between the rings and a coding disk 4 at one axial side of the bearing. The rolling bodies 3 can be held apart from each other between the rings by a separator (not shown). In this example, the inner ring 2 rotates with respect to the outer ring, and accordingly the coding disk 4 is supported on the inner ring to also rotate. The coding disk can, for instance, have galvanically applied reflective markings (not shown) or, in simple embodiments, it may be developed as a perforated plate, a corrugated plate or a gear wheel, as detailed below.

A high frequency transmitter 5, which is arranged outside the bearing, sends a high frequency electromagnetic wave to the coding disk 4. Depending on the position of the coding disk 4 as it rotates, that signal is reflected (or not) and passes to a high frequency receiver 6 which detects the reflected signal, records it, and feeds it to a signal processor. The position of the coding disk can also be determined by the evaluation of the signal transit time (see FIG. 4). Depending on the position of the coding disk, a transit time a or b is obtained. If two of the receivers are arranged alongside each other along the rotation path of the inner bearing ring (not shown), processing of the signal not only can determine the speed of rotation but also the direction of rotation. Energy is easily supplied over a current cable 7, over which the received signals are also forwarded to a signal processor 8. Modern chip manufacture makes it possible to integrate transmitter 5, receiver 6 and signal processor 8 in a single micro-component.

Figure 2:
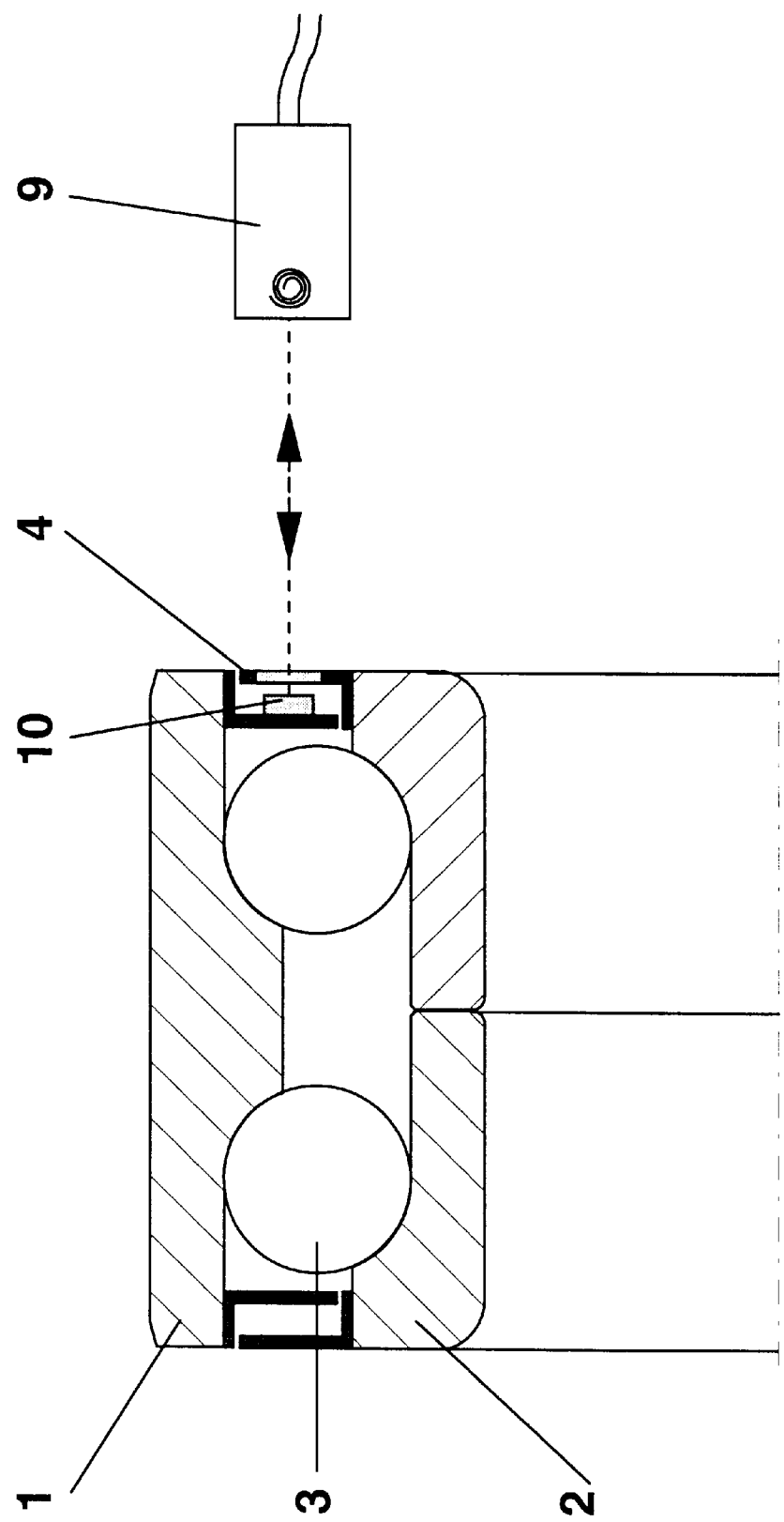
FIG. 2 diagrammatically shows a bearing construction in which a passive signal circuit in the form of an oscillatory circuit is used for producing the signal.

As shown in FIG. 2, a beam from high frequency transmitting and receiving system 9 can also be directed onto a rotating coding disk 4 behind which there is a micro-oscillatory circuit 10 arranged on the stationary bearing outer ring 1. This micro-oscillatory circuit generates a response signal when it is struck by a high frequency beam. Depending on whether or not the coding disk permits the passage of the HF beam, the micro-oscillatory circuit 10 is or is not excited to produce a response signal so that an evaluation unit integrated in the high frequency transmitting and receiving system 9 can calculate the speed of rotation and/or direction of rotation. Instead of an oscillatory circuit 10, a surface wave sensor, for instance, can also be used. The oscillatory circuit transmits a reply signal that is dependent upon the position of the coding disk and the presence or absence of waves transmitted.

Further, two of the oscillatory circuits may be arranged along the path of rotation (not shown) to enable determining the direction of rotation.

Figure 3:
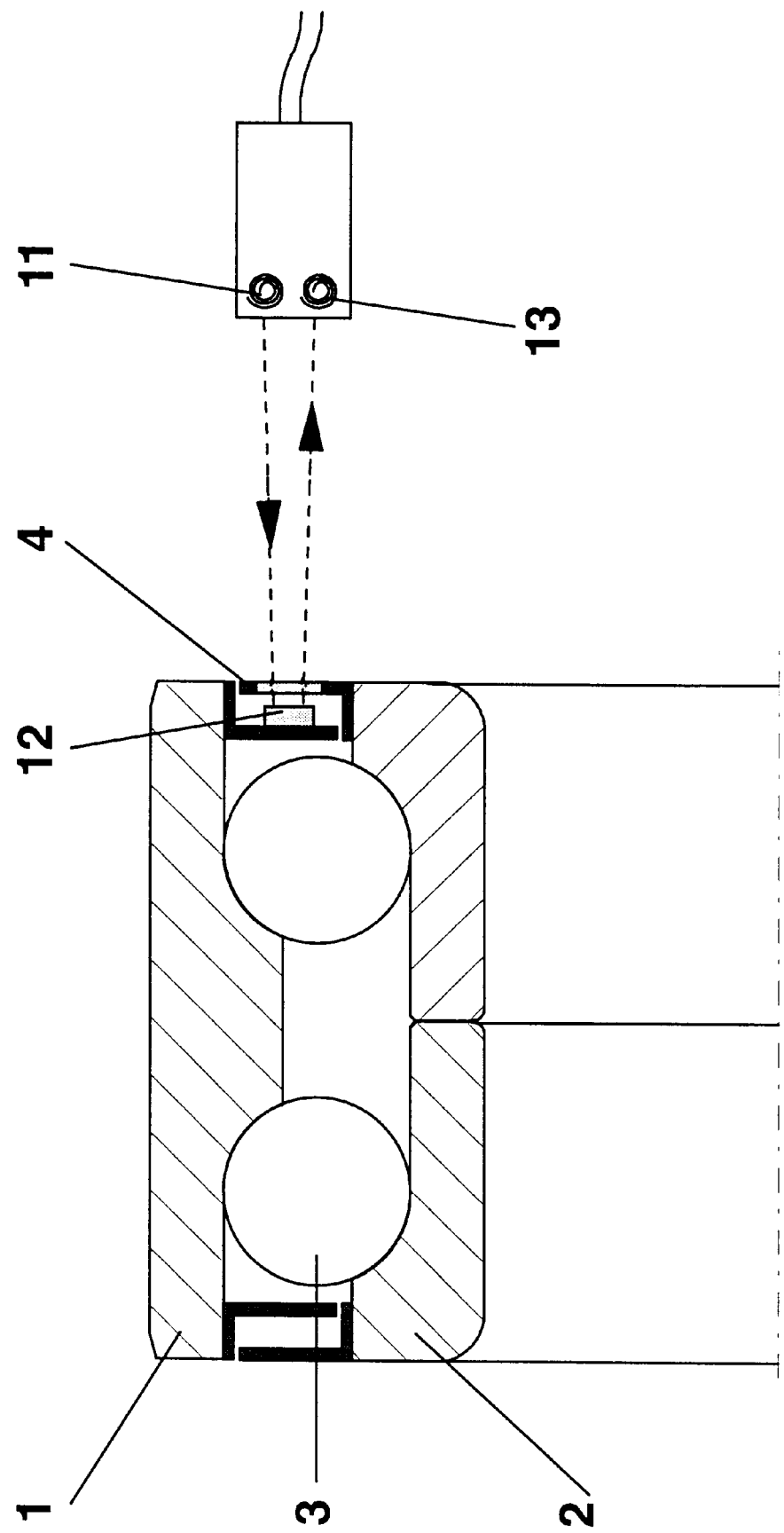
FIG. 3 diagrammatically shows a bearing construction in which an active microcircuit is supplied with energy from a frequency generator present in the bearing.

The construction shown in FIG. 3 operates in a similar manner. An active micro-circuit 12 on the stationary bearing ring 1 is provided with energy from a frequency generator 11 if the coding disk permits the passage of the high frequency beam (a hole). The micro-circuit 12 then sends out a reply signal which is received by the high frequency receiver 13 from which the reply signal is fed for evaluation. In a variant, the signal can be developed as an echo on a pulsed energy supply, which requires only a coil in the transmitter and micro-circuit, shown schematically. The transmitter sends only short pulses and the transmitter measures the response behavior of the oscillatory circuit during pauses in the transmission by the transmitter.

Using a corrugated coding disk 4 as in FIG. 4, the signal is either reflected to the receiver or past it depending on the position of the coding disk. FIGS. 4a and 4b show different configurations for the corrugated disk, with the signal shown being reflected to the receiver in the upper segment of each of FIGS. 4a and 4b. The phantom representation of the receiver in FIGS. 4a and 4b (and in FIGS. 5a and 6a described below) represents movement of the coding disk with respect to the receiver. For the phantom positions in FIGS. 4a and 4b, the signal is shown reflected past the receiver.

FIG. 4c shows another configuration for the corrugated disk 4. The difference in signal transit time resulting from the different distances a and b in FIG. 4c can also be measured and evaluated. A galvanically marked wheel with spaced markings (not shown) also will alternately reflect beams or permit them to pass.

Figure 5A:
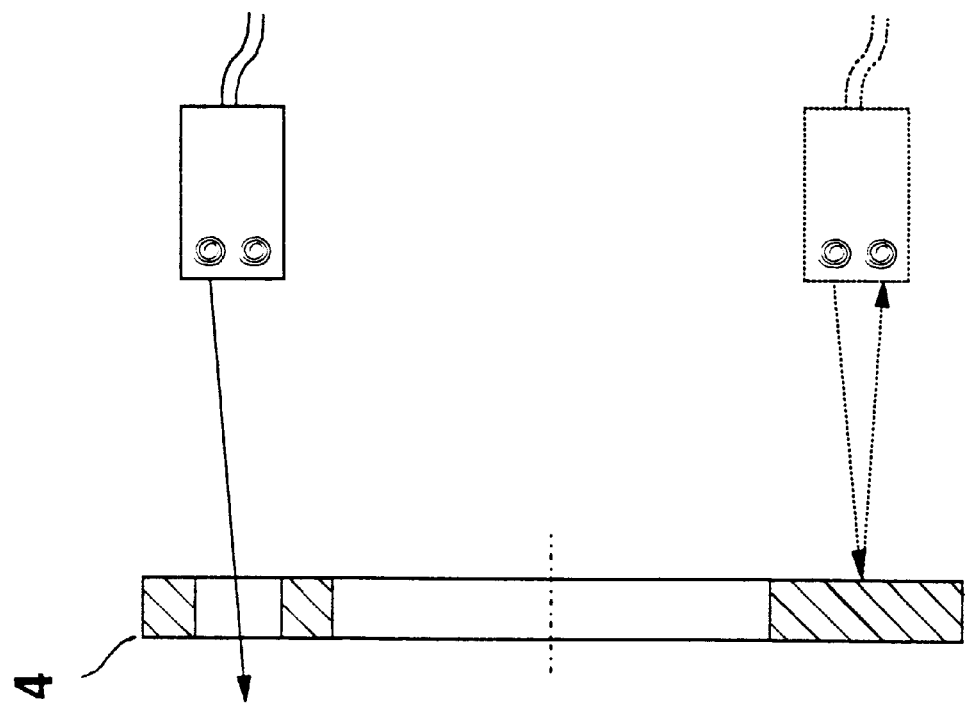
FIG. 5a shows different beam paths for the disk of FIG. 5.
Figure 5:
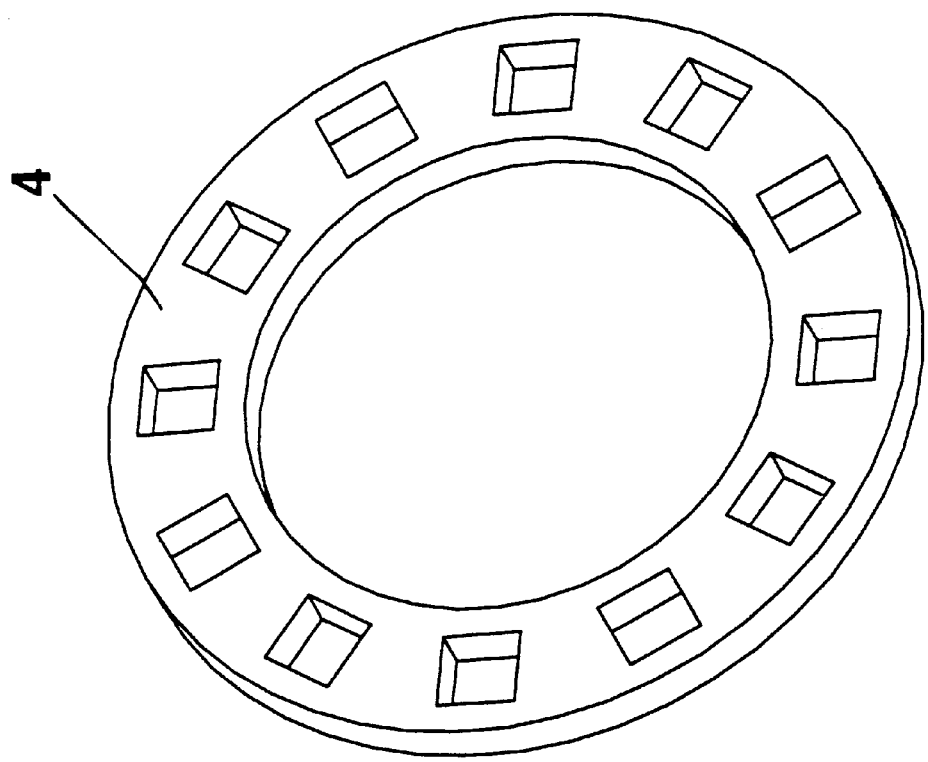
FIG. 5 shows a perforated coding disk.

In the perforated coding disk in FIG. 5, the signal is or is not reflected to the receiver depending on the position of the coding disk as it does not or does pass through perforations as in FIG. 5a.

Figure 6A:
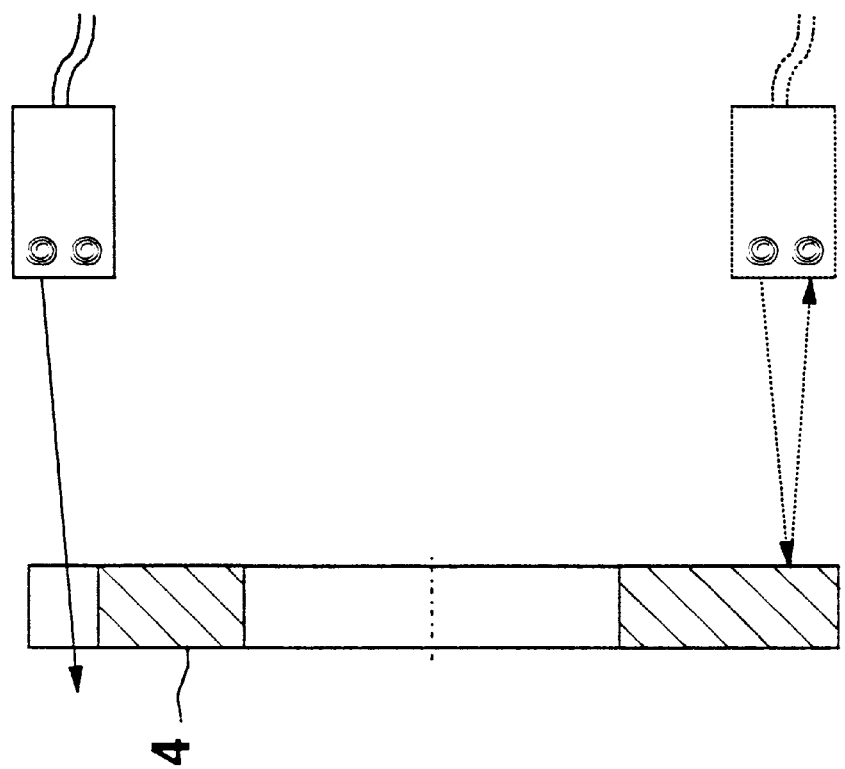
FIG. 6a shows different beam paths for the disk of FIG. 6.
Figure 6:
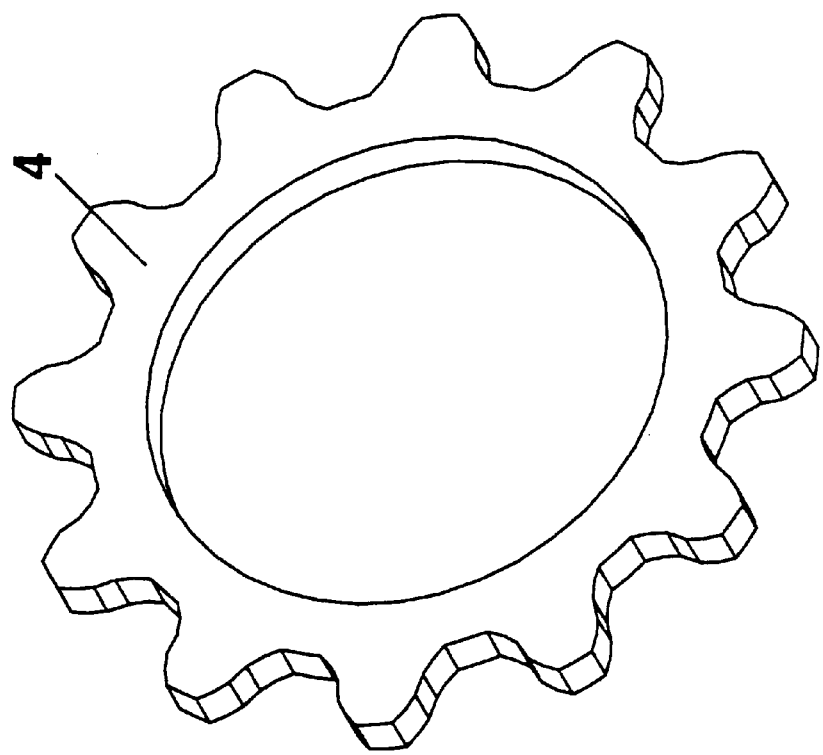
FIG. 6 shows a serrated coding disk.

Even in the case of a serrated or gear wheel shape coding disk in FIG. 6, the signal is either reflected to the receiver or not depending on the position of the coding disk as in FIG. 6a.

With the arrangements shown, a substantially greater distance between the sensor and the bearing can be present than in the case of traditional sensors. While traditional air gaps have been of a size of 0.5 to at most 3 mm, air gaps of up to 5 mm and more can be employed for an anti-friction bearing of the invention. Modern chip design makes connection inexpensive and reliable components available. Micro-circuit coils and antennas may be used, even in chips, as schematically suggested in FIGS. 1–3. The Hall and magneto-resistive sensors and their magnets heretofore used can be dispensed with. The supply of energy also does not represent any problem since no cables or plugs are necessary on the rotating part of the bearing.

It may also be pointed out that the coding disk or the transmitting and receiving device can, of course, not only be arranged axially as shown, but also radially or obliquely, and the coding disk can also be introduced in the packing between rings or in the separator between rolling bodies or in a bearing ring.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An anti-friction bearing with a speed measuring device comprising:

the bearing comprising an outer ring, an inner ring and rolling bodies between the rings, wherein at least one of the rings rotates relative to the other ring, the bearing having a side;

a coding disk arranged on and rotatable with the one rotating ring of the bearing;

a frequency generator located outside the bearing;

an active microcircuit located within the bearing which receives a signal from the frequency generator and the microcircuit generates a response signal which it transmits as a directed high frequency signal;

a receiver outside the bearing to receive the generated response signal;

the coding disk being configured for selectively either interrupting the response signal from the microcircuit or the signal from the frequency generator, depending on the rotation position of the disk for thereby producing pulses in the receiver, the receiver being connectable with a signal processor for using the pulse information.

2. The bearing and device of claim 1, wherein the coding disk comprises a disk with a plurality of holes arrayed around the disk for selectively blocking or permitting bypassage of the energy supply from the frequency generator and/or the response signal from the microcircuit.

3. The bearing and device of claim 1, further comprising the microcircuit being connected for receiving additional measurement values relating to a rotatable wheel rotatable at the bearing and for processing the additional values, the microcircuit transmitting the additional values to the receiver.

4. The bearing and device of claim 1, wherein each of the generator and the microcircuit has a respective single coil or antenna.

5. The bearing and device of claim 1, wherein the generator includes an antenna developed as a microchip and the receiver includes an antenna developed as a microchip.

6. The bearing and device of claim 1, wherein the bearing includes a seal between the inner and the outer rings and the seal includes a portion that is movable with the one movable ring of the bearing, and the coding disk is in the movable portion of the seal.

7. The bearing and device of claim 1, wherein the bearing includes a relatively stationary ring and the microcircuit is located in the portion of a seal at the relatively stationary ring.

\* \* \* \* \*